(12) United States Patent
Abdul et al.

(10) Patent No.: US 12,140,187 B2
(45) Date of Patent: Nov. 12, 2024

(54) BEARING ASSEMBLY FOR AN ELECTRIC MOTOR, AND ELECTRIC MOTOR

(71) Applicant: Aktiebolaget SKF, Gothenburg (SE)

(72) Inventors: Azeez Abdul, Utrecht (NL); Hendrik Anne Mol, Varik (NL); Frank Fiddelaers, Gorinchem (NL)

(73) Assignee: Aktiebolaget SKF, Gothenburg (SE)

( * ) Notice: Subject to any disclaimer, the term of this patent is extended or adjusted under 35 U.S.C. 154(b) by 161 days.

(21) Appl. No.: 17/881,022

(22) Filed: Aug. 4, 2022

(65) Prior Publication Data
US 2023/0037573 A1    Feb. 9, 2023

(30) Foreign Application Priority Data

Aug. 5, 2021 (DE) .......................... 102021208508.3
Dec. 15, 2021 (DE) .......................... 102021214391.1

(51) Int. Cl.
*F16C 19/06* (2006.01)
*F16C 19/52* (2006.01)
(Continued)

(52) U.S. Cl.
CPC .............. *F16C 41/002* (2013.01); *F16C 19/06* (2013.01); *F16C 19/52* (2013.01);
(Continued)

(58) Field of Classification Search
CPC ........ F16C 19/06; F16C 19/52; F16C 41/002; F16C 2202/32; F16C 2380/26;
(Continued)

(56) References Cited

U.S. PATENT DOCUMENTS 5,773,394 A * 6/1998 Wan ..................... C10M 125/02
585/12
2016/0380508 A1 * 12/2016 Kocevar ............. F16J 15/4476
310/75 R
(Continued)

FOREIGN PATENT DOCUMENTS

CN     201563020 U      8/2010
DE     112009001785 T5 * 1/2012 .......... C10M 169/00
(Continued)

OTHER PUBLICATIONS

JP2015208082_Description.*

*Primary Examiner* — Phillip A Johnson
(74) *Attorney, Agent, or Firm* — GARCIA-ZAMOR INTELLECTUAL PROPERTY LAW, LLC; Ruy Garcia-Zamor

(57) ABSTRACT

A bearing assembly for an electric motor for a vehicle, having at least one main bearing configured to support a rotational element of the electric motor, and a sacrificial bearing. The main bearing includes at least one inner ring having at least one inner raceway, at least one outer ring having at least one out raceway, and at least one plurality of rolling elements disposed between the raceways. The sacrificial bearing provides an outer ring having an outer raceway, an inner ring having an inner raceway, and a plurality of rolling elements disposed between the outer ring and the inner ring. The sacrificial bearing is provided with an electrically conductive lubricant configured to lubricate the rolling elements of the sacrificial bearing. The main bearing is provided with an isolating lubricant configured to lubricate the rolling elements of the main bearing, wherein the isolating lubricant is electrically isolating.

10 Claims, 3 Drawing Sheets

(51) Int. Cl.
*F16C 33/66* (2006.01)
*F16C 41/00* (2006.01)
*H02K 5/173* (2006.01)

(52) U.S. Cl.
CPC ....... *F16C 33/6633* (2013.01); *H02K 5/1735* (2013.01); *F16C 2202/32* (2013.01); *F16C 2380/26* (2013.01)

(58) Field of Classification Search
CPC .. F16C 33/6633; H02K 5/1732; H02K 7/083; H02K 11/40; C10M 125/04; C10M 125/08; C10M 125/10; C10N 2040/02; C10N 2040/26
See application file for complete search history.

(56) References Cited

U.S. PATENT DOCUMENTS

| | | | |
|---|---|---|---|
| 2018/0006493 A1* | 1/2018 | Ludois | F16C 41/002 |
| 2018/0100114 A1 | 4/2018 | Gao et al. | |
| 2018/0100118 A1* | 4/2018 | Flores-Torres | C10M 169/04 |

FOREIGN PATENT DOCUMENTS

| | | | |
|---|---|---|---|
| JP | 2015208082 A | * | 11/2015 |
| WO | 2017214239 A1 | | 12/2017 |

* cited by examiner

BEARING ASSEMBLY FOR AN ELECTRIC MOTOR, AND ELECTRIC MOTOR

CROSS-REFERENCE TO RELATED APPLICATIONS

This application claims priority to German Patent Application no. 102021214391.1, filed Dec. 15, 2021, and German Patent Application 102021208508.3, filed Aug. 8, 2021, the contents of which are both fully incorporated herein by reference.

TECHNICAL FIELD OF THE INVENTION

The present invention relates to a bearing assembly for an electric motor. The invention also relates to an electric motor.

BACKGROUND OF THE INVENTION

The state of the art is illustrated in the attached FIG. 1. Generally, an electric motor 10 includes a case 12, a rotor having a rotor shaft 14 and rotor windings 15, a stator having stator windings 16, one or more bearings 18, 20 coupling the rotor shaft 14 to the case, and various electrical connections (not illustrated). It is common to use variable frequency drives (VFDs) for the electrical motor control. Usually VFDs comprise insulated gate bi-polar transistors (IGBTs) and/or metal-oxide-semiconductor field-effect transistors (MOSFETs), which are being switched in a rather fast manner and comprise steep switching flanks. However, the fast switching of the IGBTs used in VFDs can cause high frequency grounding currents 24 as well as high frequency circulating currents 22 which are generated in the rotor and are driven by common mode voltages through coupling capacitances from stator to rotor and stator-core to stator-iron respectively, which may have a significant influence on a failure of the rotor bearing.

Initially, hydrodynamic films developed inside the bearing contacts resist the flow of electrical current leading to a potential difference across the bearing 18, 20. Hence, a bearing 18, 20 with contacts fully separated by lubricating oil films effectively behaves as an additional capacitor resisting the flow of current to the ground 28. After a certain voltage limit is reached, hydrodynamic films collapse leading to a discharge event 26 inside the bearing 18, 20. The number of discharge events and energy behind each discharge determines the extent to which the bearing is damaged. In that case, the main damage of the bearing is the electrical erosion of rolling surfaces in the bearing: inner raceway, outer raceways, and outer surface of the rolling elements. The bearing is then not suitable to accurately and precisely support in rotation the rotor shaft: vibration, noise, temperature increase and then cracks may lead to the failure of the bearing and then of the electrical motor.

It is therefore object of the present invention to provide a bearing assembly for an electric motor having a rotor supporting bearing with an increased durability against electrical current discharge damages and an increased lifetime.

SUMMARY OF THE INVENTION

In the following, a bearing assembly for an electric motor, particularly for a vehicle, is provided. The bearing assembly comprises at least one main bearing configured to support a rotational element of the electric motor, and a so-called sacrificial bearing. The main bearing comprises at least one inner ring providing at least one inner raceway, at least one outer ring providing at least one outer raceway, the inner and outer rings being in relative rotation, and at least one plurality of rolling elements disposed between the inner and outer ring of the main bearing. One of the bearing rings is coupled in rotation with the rotational element of the electric motor. The sacrificial bearing comprises an outer ring with an outer raceway, an inner ring with an inner raceway, the inner and outer rings being in relative rotation, and a plurality of rolling elements disposed between the outer ring and the inner ring. One of the sacrificial bearing rings is coupled in rotation with the rotational element of the electric motor, the other ring being grounded.

For example, the bearing assembly may comprise only one, or two or more main bearings. Thereby, the main bearing or the main bearings is/are adapted/designed to support the rotational part of the electric motor and should be protected from any damage which might occur due to electric current or voltage accumulating in the bearing, whereas the sacrificial bearing also supports the rotational part but is allowed to be damaged due to discharge events.

Advantageously, both the main bearing and the sacrificial bearing are provided with a lubricant configureD to lubricate the rolling elements of the respective bearing.

According to the invention, the sacrificial bearing is provided with a conductive lubricant configured to lubricate the rolling elements of the sacrificial bearing, wherein the conductive lubricant is electrically conductive, and wherein at least one main bearing is an isolated bearing.

More precisely, for protecting the at least one main bearing from electrical discharge events, it is proposed to inherently increase the main bearing's capacitance and breakdown voltage, and to provide a high resistance path for the flow of currents such as common mode grounding currents and/or differential mode circulating currents. Simultaneously, a low resistance path is created through the sacrificial bearing for ensuring that the high frequency grounding currents are grounded through the sacrificial bearing. For that, the lubricant of the sacrificial bearing is a conductive lubricant which is electrically conductive, and the at least one main bearing is an electrically isolated or insulated bearing.

Thereby, the main bearing is adapted/designed to be the main support in rotation of the rotational part of the electric motor, and then should be protected from any damage which might occur due to electric current or voltage accumulating in the bearing. On the contrary, the sacrificial bearing, also supporting the rotational part, is allowed to be damaged due to discharge events. The support in rotation of the rotational element is then ensured at any time, whereas the sacrificial bearing, that has no rotation supporting function, permits the current flowing through it.

According to further aspects of the invention which are advantageous but not compulsory, such a bearing assembly for an electric motor may incorporate one or several of the following features:

The conductive lubricant of the sacrificial bearing is further configured to reduce a buildup of electric potential.

The conductive lubricant is a grease.

The sacrificial bearing may be not only optimized for having a low breakdown voltage level, so that relatively few occurrences of electrical breakdown may happen in the at least one main bearing, but also that an energy level of each discharge in any bearing may be relatively small. The energy level of a discharge is $E=\frac{1}{2} C_{total} V_{discharge}^2$, wherein $C_{total}$ is the total capacitance of the bearing, and $V_{discharge}$ is the voltage of the discharge.

The at least one main bearing which is an isolated bearing is arranged at a non-driven end of the electric motor. This is beneficial since electric charges may accumulate at the non-drive end of rotor of the electric motor.

At least one main bearing is a hybrid bearing and/or at least one main bearing has an isolation coating and/or at least one main bearing has an isolation sleeve, and/or at least one main bearing is provided with an isolating or insulating lubricant configured to lubricate the rolling elements of the main bearing, wherein the isolating lubricant is electrically isolating. For example, a hybrid bearing is a bearing with a set of ceramic rolling elements and/or at least one ceramic bearing ring, and an isolation sleeve may be an anodized ring, wherein the ring may be a separate ring inserted into the bearing or may be a part of the bearing, for example a part of an inner or outer bearing ring.

In case that the bearing assembly includes two or more main bearings, the isolated main bearings may be of the same type, e. g. two bearings with an isolation sleeve, or of a different type, e. g. a hybrid bearing and a bearing having an isolating lubricant.

The isolating lubricant is a grease.

The at least one main bearing may comprise an isolation, for example a coating, which is arranged around a contact surface of the inner ring and/or the outer ring to a component being supported by the main bearing, wherein the contact surface is a bore, an end face, and/or an outer circumferential surface.

The isolation is configured as a capacitance in series such that a voltage over the rolling contacts of the rolling elements is decreased with a ratio of Ciso/(Ciso+Cbearing), wherein Ciso is the capacitance of the isolation and Cbearing is capacitance of the bearing. By decreasing the voltage over the rolling contacts of the rolling elements, the probability that the main bearing is damaged due to discharge events can be reduced. For example, the main bearing may have a capacitance of 50 pF or more, and the sacrificial bearing may have a capacitance of less than 50 pF.

At least one, preferably more than one, main bearing may be arranged at one axial end of the rotational element, particularly at a drive end of the electric motor, and a single main bearing may be arranged at the other axial end of the rotational element, particularly at a non-driven end of the electric motor, wherein the single main bearing is a hybrid bearing.

The conductive lubricant provides a conductivity of more than 1 µS, preferably more than 20 µS, for the sacrificial bearing and/or the isolating lubricant provides a conductivity of less than 20 µS, preferably less than 1 µS, for the main bearing.

The isolating lubricant provided in the main bearing may include an additive that is configured to bind itself on a surface of the at least one inner raceway and/or the at least one outer raceway and/or the rolling elements of the main bearing for increasing a surface potential and/or a surface isolation. This may also lead to a higher dielectric strength of the main bearing and thus to an increase of the breakdown voltage for the main bearing.

isolating lubricant comprises aliphatic, alicyclic, aromatic di-, tetra- and/or polyurea and mixtures thereof; and/or oil and/or grease compounds comprising alkylnaphthanate compounds; and/or oil and/or grease compounds comprising (cyclo) penta-based esters, penta-based glycerol esters, penta-based polymer esters or mixtures with ether oils; and/or ionic liquids, preferably trifluoromethane sulfonate, triflate, methyl triflate, preferably comprising (bis) trifluoromethyl sulfonyl amide ions (based salts) and/or ethyl methyl imididazolin based; and/or multialkylated cyclopenta; and/or perfluoropolyether, perfluoroalkylpolyether, perfluororinated alkylether; and/or polytetrafluoroethylene-based compounds; and/or aryl ether compounds; and/or organic clay compounds; and/or silica compounds; and/or metal fluoride compounds; and/or metal organo phosphate salts; and/or one or more metal salts of one or more different organic acids and/or carboxylic acids, wherein the salts have high solubility, and the acids are branched or unbranched, saturated or unsaturated; and/or ammonium salts or amide carboxylic acids either derived from one or more different organic acids and/or carboxylic acids or from dianhydride amine compounds; and/or silica; and/or metal thickened oils, metal saponified greases, clay thickened greases, glycerol or glycol thickened greases, silicon oxide thickened greases, polytetrafluoroethylene thickened greases and/or pastes; and/or thermo-chemical stable products, passivating capability in response to (bearing steel) surfaces with preferably high surface sticking characteristics; and/or metal thickened oils, metal saponified greases, clay thickened greases, glycerol or glycol thickened greases, silicon oxide thickened greases, polytetrafluoroethylene thickened greases, aliphatic, alicyclic, aromatic di-, tetra- and/or polyurea and mixtures thereof and/or pastes.

The conductive lubricant comprises a fluid preferably oil or semifluid grease composition comprising one or more metal salts of one or more different organic acids and/or carboxylic acids, wherein the fluid comprises high ion mobility, preferably non-polar, polar base fluids or ionic fluids, wherein the salts have high solubility, and the acids are branched or unbranched, saturated or unsaturated; and/or a fluid preferably oil or semifluid grease composition comprising strong acids preferably near to or fully ionized; and/or soluble weak acids; and/or a fluid preferably oil or semifluid grease composition comprising soluble one or more bases, preferable hydroxides of alkali metals, wherein the fluid comprises high ion mobility, and the hydroxides have high solubility; and/or thermo-chemical stable products, passivating capability in response to (bearing steel) surfaces with preferably high surface sticking characteristics; and/or esters that are prone to hydrolyzing effects; and/or ionic liquids, preferably trifluoromethane sulfonate, triflate, methyl triflate; and/or one or more metal salts of one or more different organic acids and/or carboxylic acids, wherein the acids are branched or unbranched, saturated, or unsaturated; and/or organometallic bismuth compounds and/or organometallic copper compounds; and/or ammonium salts or amide carboxylic acids either derived from one or more different organic acids and/or carboxylic acids or from dianhydride amine compounds; and/or oxides (semi-conductivity); and/or metal particles low in crystallinity, preferably silver, copper, bismuth; and/or carbon black; and/or metal salts of naphthenic acid; and/or metal fluoride compounds; and/or water based lubricants like amide based compounds, amine based compounds, glycerol, and glycol, non-inverted micelle technologies; and/or metal thickened oils, metal saponified greases, clay thickened greases, glycerol or glycol thickened greases, silicon oxide thickened greases, polytetrafluoroethylene thickened greases, aliphatic, alicyclic, aromatic di-, tetra- and/or polyurea and mixtures thereof and/or pastes.

The isolating lubricant, in particular for use in at least one main bearing, comprises aliphatic, alicyclic, aromatic di-, tetra- and/or polyurea and mixtures thereof, and/or alkylnaphthanate compounds, and/or (cyclo) penta based esters, penta based glycerol esters, penta based polymer esters or mixtures with ether oils, and/or trifluoromethane sulfonate, triflate, methyl triflate, (bis) trifluoromethyl sulfonyl amide ions and (bis) trifluoromethyl sulfonyl amide based salts, and/or ethyl methyl imididazolin based compounds; and/or multialkylated cyclopenta; and/or perfluoropolyether, perfluoroalkylpolyether, perfluororinated alkylether; and/or polytetrafluoroethylene based compounds; and/or aryl ether compounds; and/or silica compounds, and/or metal organo phosphate salts.

The isolating lubricant, in particular for use in at least one main bearing, may be a fluid, preferably a non-polar, polar base fluids or ionic fluid. Moreover, the isolating lubricant may comprise one or more metal salts of one or more different organic acids or carboxylic acids, one or more ammonium salts and/or amide carboxylic acids, wherein preferably the acids are branched or unbranched and/or saturated or unsaturated, and/or the salts have a high solubility. Preferably, the isolating lubricant is an oil or a semifluid grease composition or a grease or a water-based lubricant. Also, the isolating lubricant may comprise metal thickened oils, metal saponified greases, clay thickened greases, glycerol or glycol thickened greases, silicon oxide thickened greases, polytetrafluoroethylene thickened greases, aliphatic, alicyclic, aromatic di-, tetra- and/or polyurea and mixtures thereof and/or pastes.

The conductive lubricant, in particular for use in the sacrificial bearing, includes an additive that is configured to bind itself on a surface of the at least one inner raceway and/or the at least one outer raceway and/or the rolling elements and to decrease a surface potential and/or a surface isolation. This may also lead to a lower dielectric strength of the sacrificial bearing and thus a decrease of the breakdown voltage for the sacrificial bearing.

The conductive lubricant, in particular for use in the sacrificial bearing, may be a fluid, preferably a non-polar, polar base fluids or ionic fluid.

The conductive lubricant may comprise strong acids, preferably near to or fully ionized, or soluble weak acids, or one or more soluble bases, preferable hydroxides of alkali metals.

The fluid may comprise a high ion mobility, and the hydroxides may have a high solubility.

The conductive lubricant comprises one or more metal salts of one or more different organic acids or carboxylic acids, one or more ammonium salts and/or amide carboxylic acids, wherein preferably the acids are branched or unbranched and/or saturated or unsaturated, and/or the salts have a high solubility.

The conductive lubricant, in particular for use in the sacrificial bearing, comprises oxides, particularly semiconductive oxides, and/or metal particles which are low in crystallinity, preferably silver, copper, and/or bismuth, and/or carbon black, and/or metal fluoride compounds.

The conductive lubricant may comprise thermo-chemical stable products having a passivating capability in response to a surface, particularly a bearing steel surface, with preferably high surface sticking characteristics, and/or esters having hydrolyzing effects, and/or ionic liquids, preferably trifluoromethane sulfonate, triflate, and/or methyl triflate, and/or organometallic bismuth compounds and/or organometallic copper compounds.

The conductive lubricant, in particular for use in at least one main bearing, is oil or a semifluid grease composition or grease or a water-based lubricant.

The conductive lubricant of the sacrificial bearing may comprise at least one additive that is configured to reduce lubricant oil dissociation and/or to prevent lubricant polymerization into a high viscosity matter.

The lubricant of the main bearing is designed that a value of a breakdown voltage for the main bearing is large, e.g., advantageously larger than 10V, and/or the lubricant of the sacrificial bearing is designed that a value of a breakdown voltage for the sacrificial bearing is small, e.g., advantageously below 10V. This has the advantage that the main bearing is protected from damages caused by electric current running through the main bearing, while also providing a path for the electric current through the sacrificial bearing.

The value of the breakdown voltage is related to a value of Hertzian contact pressure, and wherein the value of Hertzian contact pressure of the main bearing is large, e.g., larger than 500 MPa, and/or the value of Hertzian contact pressure of the sacrificial bearing is small, e.g., smaller than 500 MPa. Larger Hertzian contact pressure may lead to a larger capacitance of the respective bearing, while smaller Hertzian contact pressure may lead to a smaller capacitance of the respective bearing. Thus, by providing larger Hertzian contact pressure the value of the breakdown voltage can be increased, which may increase the lifetime of the main bearing as the number of discharge events in the main bearing may be reduced. In contrast, the breakdown voltage in the sacrificial bearing may be decreased by the smaller Hertzian contact pressure, which causes the current to run through the sacrificial bearing such that the main bearing is further protected. In particular, the Hertzian contact pressure can be reduced by increasing a ratio between a radius of the rolling elements and a ring cross radius and/or by providing an open osculation. Preferably, value of Hertzian contact pressure of the sacrificial bearing is smaller than a value of Hertzian contact pressure of the main bearing.

The value of the breakdown voltage of the bearing is related to a surface roughness of a component of a bearing, and wherein the surface roughness of a component of the main bearing is low, e.g., Ra is smaller than 50 nm, and/or wherein the surface roughness of a component of the sacrificial bearing is large, e.g., Ra is larger than 50 nm. Preferably, the surface roughness of a component of the sacrificial bearing is larger than a surface roughness of a component of the main bearing. Preferably, at least one surface of the at least one inner raceway and/or the at least one outer raceway of the main bearing comprises a coating such that a breakdown voltage of the surface with the coating is higher than the breakdown voltage of the surface without the coating. By increasing the surface roughness in the sacrificial bearing, the breakdown voltage of the sacrificial bearing is decreased such that the electric current can be grounded by the sacrificial bearing.

The sacrificial bearing and/or the main bearing is provided with a cage configured to retain the rolling elements of the respective bearing, wherein the cage also comprises a storage capacity for lubricant and/or at least one lubricant additive. This allows that fresh lubricant and/or lubricant additive can be supplied such that the lifespan of the bearing may be prolonged.

The breakdown voltage is related to a rolling element surface velocity, and the rolling element surface velocity of the sacrificial bearing may be smaller than a rolling element surface velocity of the main bearing. This can be achieved by using a relatively small bearing as the sacrificial bearing, e.g., a bearing having a bore diameter between 6 mm and 12 mm, for example around 8 mm, and an outer diameter between 18 mm and 26 mm, for example around 22 mm.

The main bearing is a hybrid bearing with a set of ceramic rolling elements and/or at least one ceramic bearing ring. Moreover, the sacrificial bearing is a steel bearing with a set of steel rolling elements and steel bearing rings.

The invention also concerns an electric motor. The electric motor comprises a case, a stator having stator windings, a rotor having a rotor shaft and rotor windings, and at least one bearing assembly according to any of the preceding embodiments, wherein the main bearing of the bearing assembly is configured to support the rotor of the electric motor, and the sacrificial bearing is configured to have at least one ring fixed in rotation to the rotor.

Preferably, at least one main bearing which is designed as an isolated main bearing is arranged at a non-driven end of the rotor of the electric motor.

Further preferred embodiments are defined in the dependent claims as well as in the description and the figures. Thereby, elements described or shown in combination with other elements may be present alone or in combination with other elements without departing from the scope of protection.

In the following, preferred embodiments of the invention are described in relation to the drawings, wherein the drawings are exemplarily only, and are not intended to limit the scope of protection. The scope of protection is defined by the accompanied claims, only.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings In the following, preferred embodiments of the invention are described in relation to the drawings, wherein the drawings are exemplarily only, and are not intended to limit the scope of protection. The scope of protection is defined by the accompanied claims, only.

The figures show.

DETAILED DESCRIPTION OF THE INVENTION

Figure 1:
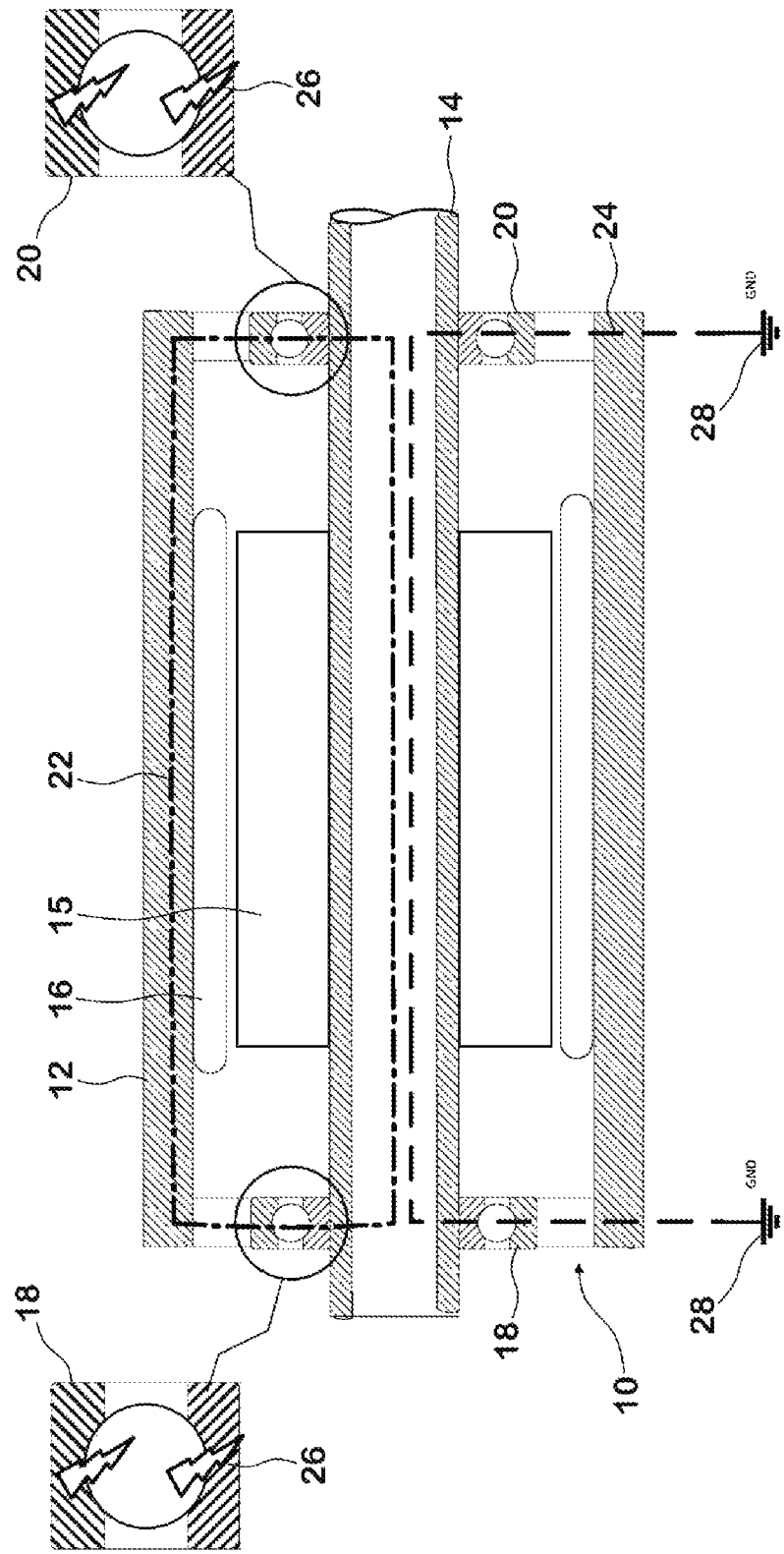
FIG. 1: a schematic view of an electric motor according to the prior art.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. In the following, same or similar functioning elements are indicated with the same reference numerals.

Figure 2:
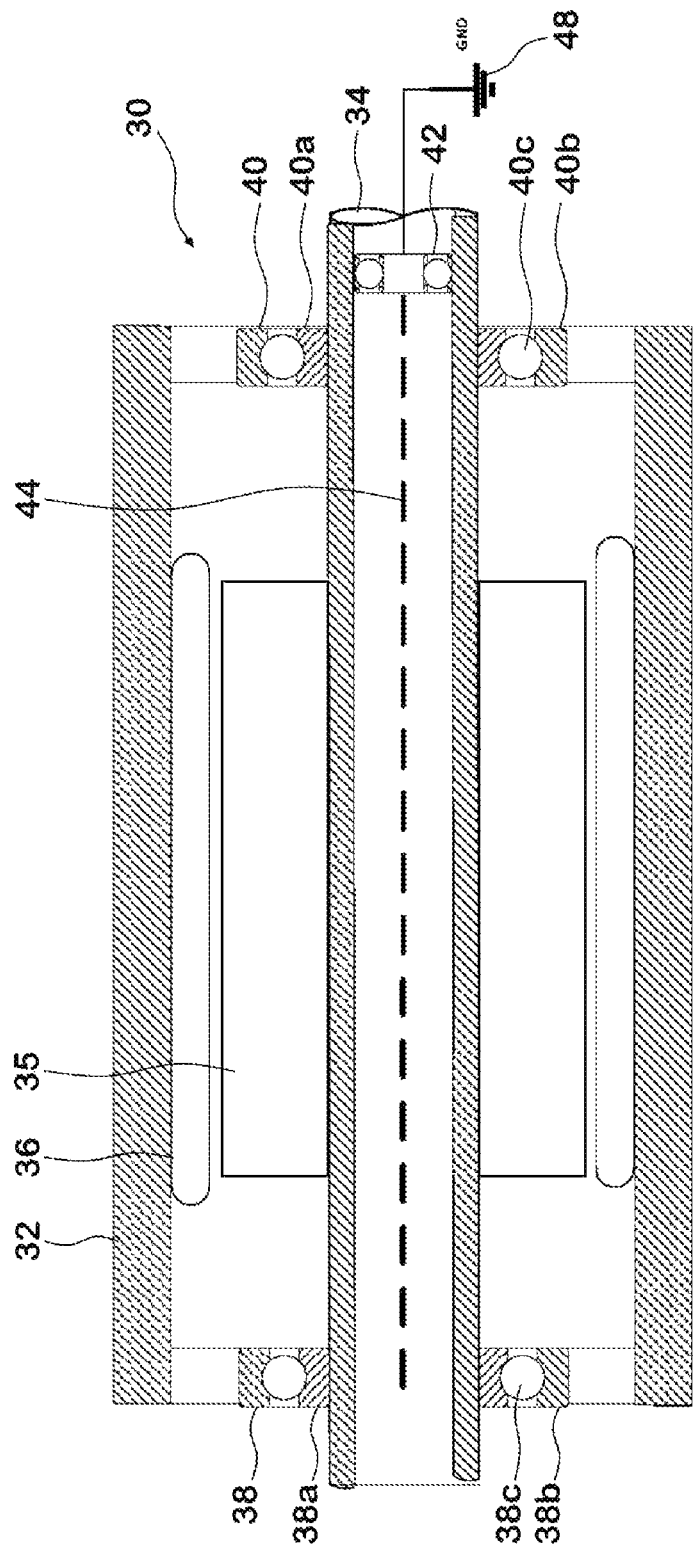
FIG. 2: a schematic view of an electric motor including a main bearing and a sacrificial bearing according to an embodiment of the present invention.

FIG. 2 shows a schematic view of a bearing assembly for an electric motor 30, particularly for a vehicle. The electric motor 30 includes a case 32, a rotor having a rotor shaft 34 and rotor windings 35, a stator having stator windings 36, two main bearings 38, 40 coupling the rotor shaft 34 to the case 32, and various electrical connections (not illustrated).

The two main bearings 38, 40 illustrated in the FIG. 2 are similar. Alternatively, main bearings 38, 40 may be of different type and size. Main bearings 38, 40 comprise each an inner ring 38a, 40a having at least one inner raceway, an outer ring 38b, 40b having at least one out raceway, and a set of rolling elements 38c, 40c, here balls, disposed between the inner and outer rings 38a, 48b and 40a, 40b, respectively. The rolling elements of the bearing 38, 40 may be any kind of rolling element such as balls, rollers, tapered rollers, needle rollers, etc.

Advantageously, both the main bearings 38, 40 are provided with a lubricant, preferably a grease, configured to lubricate the rolling elements of the respective bearing. According to another embodiment, both the main bearings 38, 40 may be provided with a cage configured to retain the rolling elements 38c, 40c of the respective bearing 38, 40. The cage may also comprise a storage capacity for lubricant and/or at least one lubricant additive. This allows that fresh lubricant and/or lubricant additive can be supplied such that the lifespan of the bearing may be prolonged.

The inner ring 38a of main bearing 38 is coupled in rotation with an outer circumferential surface of the rotational shaft 34, and the outer ring 38b is fixed in the case 32. The inner ring 40a of main bearings 38, 400 is coupled in rotation with an outer circumferential surface of the rotational shaft 34, and the outer ring 40b is fixed in the case 32. The main bearings 38, 40 support in rotation the rotational shaft 34 of the electric motor 30 with respect to the case 32. Advantageously, each of the main bearings 38, 40 is mounted on one side of the rotor and stator windings 35, 36. Main bearings 38, 40 are preferably arranged at non-driven ends of the electric motor 30. This is beneficial since electric charges may accumulate at the non-drive end of rotor of the electric motor As illustrated in FIG. 1 as prior art, high frequency grounding currents 24 as well as high frequency circulating currents 22 can be are generated in the rotor shaft 14, 34. These currents can then pass through one of the main bearings and damage its components. More particularly, the surfaces of raceways and/or the balls mays have failures. According to the invention illustrated in FIG. 2, the main bearings 38, 40 are electrically isolated, and the electric motor 30 is further provided with a sacrificial bearing 42.

Figure 3:
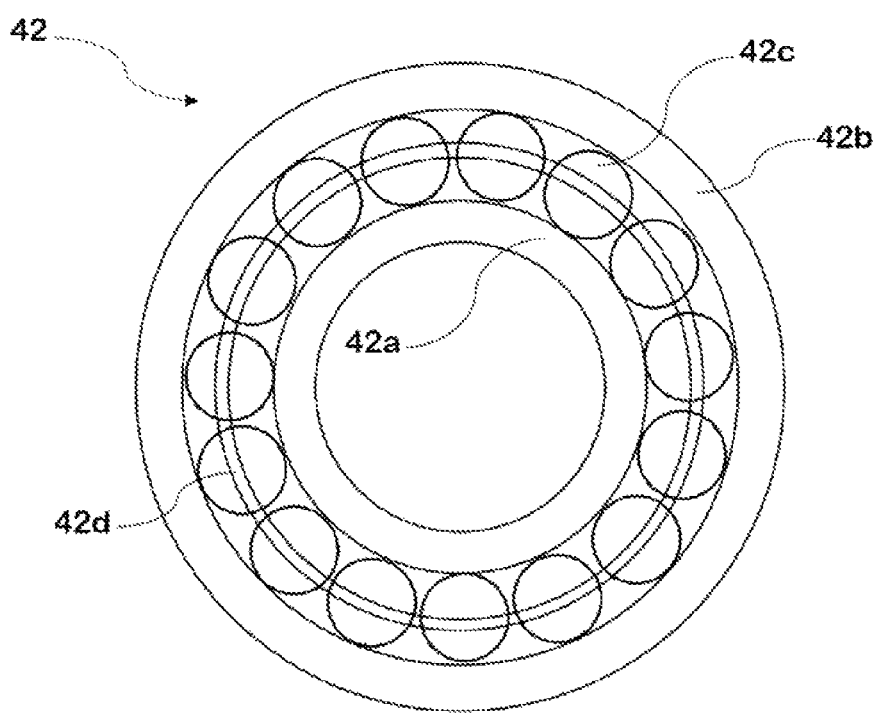
FIG. 3: a schematic view of the sacrificial bearing of FIG. 2.

The sacrificial bearing 42 is illustrated in FIG. 3, and comprises an inner ring 42a having an inner raceway, an outer ring 42b having an outer raceway, and a at least one set of rolling elements 42c, here balls, disposed between the inner ring and outer rings 42a, 42b. Advantageously, the sacrificial bearing 42 is provided with a lubricant, preferably a grease, configured to lubricate the rolling elements 42c. According to another embodiment, the sacrificial bearing 42 is provided with a cage 42d configured to retain the rolling elements 42c. The cage may also comprise a storage capacity for lubricant and/or at least one lubricant additive. This allows that fresh lubricant and/or lubricant additive can be supplied such that the lifespan of the bearing may be prolonged.

In the illustrated example, the outer ring 42b of the sacrificial bearing 42 is coupled in rotation with the rotor shaft 34, and the inner ring 42a is fixed to a grounded feature 48 of the electric motor 30. As an alternate embodiment, the inner ring 42a may be coupled in rotation with the rotor shaft 34, and the outer ring 42b is fixed to a grounded feature 48.

According to the present invention, and for protecting the main bearings 38, 40 from electrical discharge events, the conductivity of the sacrificial bearing 42 is preferably higher than 20 µS, and the value of a breakdown voltage for the sacrificial bearing 42 is smaller than the value of the breakdown voltage for the main bearings 38, 40. As illustrated in FIG. 2, by decreasing the sacrificial bearing's breakdown voltage, a low resistance path is created through the sacrificial bearing for ensuring that the currents such as high frequency grounding currents and/or differential mode circulating currents are grounded through the sacrificial bearing 42. More precisely, the currents pass from the rotor shaft to the outer ring 42b, the rolling elements 42c and the inner ring 42a, successively, and then to ground 48.

To this end, the main bearings 38, 40 being electrically isolated on one hand, and the sacrificial bearing 42 being configured to have a damped electrical conduction on the other hand, the bearing arrangement is configured to have different breakdown values. More particularly, to a given breakdown value of the main bearings 38, 40, the sacrificial bearing 42 is configured to have a smaller breakdown value than that of the main bearings. On the contrary, for a given breakdown value of the sacrificial bearing 42, the main bearings 38, 40 are configured to have a higher breakdown value than that of the sacrificial bearing. In the following, some examples are given to illustrate technical solutions to adjust the breakdown values of the main bearings and/or sacrificial bearing so as to ensure the current passage through the sacrificial bearing and the protection of the main bearings from electrical discharge events.

Advantageously, the capacitance and/or a breakdown voltage of the main bearings 38, 40 can be increased. For example, material and/or geometrical characteristic of the main bearings 38, 40 may also be optimized in such a way that the capacitance and/or a breakdown voltage of the main bearings 38, 40 is increased.

To further aid in the protection of the main bearings 38, 40, the breakdown voltage of the sacrificial bearing 42 is decreased such that the sacrificial bearing 42 provides a low resistance path for ensuring that the currents such as high frequency grounding currents and/or differential mode circulating currents are grounded through the sacrificial bearing. This can be achieved by using an electrically conductive lubricant in the sacrificial bearing 42.

For this purpose, the conductive lubricant of the sacrificial bearing 42 may be advantageously configured to reduce a buildup of electric potential. Additionally, material and/or geometrical characteristic of the sacrificial bearing 42 may also be optimized in such a way that a breakdown voltage of the sacrificial bearing 42 is decreased.

For example, the conductive lubricant may include an additive that is configured to bind itself on a surface of the at least one inner raceway and/or the at least one outer raceway and/or the rolling elements of the sacrificial bearing 42 and to decrease a surface potential and/or a surface isolation. This may also lead to a lower dielectric strength of the sacrificial bearing 32 and thus a decrease of the breakdown voltage for the sacrificial bearing 42.

Furthermore, the conductive lubricant may be a fluid, preferably a non-polar, polar base fluids or ionic fluid. Moreover, the conductive lubricant may comprise strong acids, preferably near to or fully ionized, or soluble weak acids, or one or more soluble bases, preferable hydroxides of alkali metals. Also, the fluid may comprise a high ion mobility, and the hydroxides may have a high solubility.

As illustrated in FIG. 2, the sacrificial bearing 42 is advantageously relatively small or at least smaller than the main bearings 38, 40 to reduce a rolling element surface velocity. For example, the sacrificial bearing 42 may have a bore diameter between 6 mm and 12 mm, for example around 8 mm and an outer diameter between 18 mm and 26 mm, for example around 22 mm. The rolling element surface velocity is related to the breakdown voltage. Thus, by reducing the rolling element surface velocity the breakdown voltage can also be decreased.

To further decrease the breakdown voltage ration of the sacrificial bearing 42, the bearing 42 has preferably a large ratio between the radius of the rolling elements 42c and a ring cross radius which reduces a Hertzian contact pressure. This decreases a capacitance of the sacrificial bearing 42 and therefore also a breakdown voltage of the sacrificial bearing 42. Vice versa, it could be advantageous to configure the main bearings 38, 40 for a larger Hertzian contact pressure, which increases the value of the breakdown voltage of the main bearings 38, 40 and therefore the lifetime of the main bearings 38, 40. Finally, the value of Hertzian contact pressure of the sacrificial bearing 42 is smaller than a value of Hertzian contact pressure of the main bearings 38, 40.

According to another embodiment of the invention, at least one of the components of the sacrificial bearing 42, such as the inner ring 42a, the outer ring 42b and/or the rolling elements 42c, has preferably a rather large surface roughness as this also decreases a breakdown voltage. For example, the surface roughness of the at least one of the components of the sacrificial bearings 42 is larger than 50 nm. In contrast, the surface roughness of a component of the main bearing 38, 40 may be preferably low. The raceways of the main bearing 38, 40 may advantageously, comprises a coating that increases the breakdown voltage.

Moreover, the sacrificial bearing may be a steel bearing with a set of steel rolling elements and steel bearing rings. The rolling elements of the sacrificial bearing 42 may be any kind of rolling element such as balls, rollers, tapered rollers, needle rollers, etc.

In addition to the conductive sacrificial bearing 42, the electric motor 30 illustrated in FIG. 2 is further provided with two main bearings 38, 40 that are electrically isolated.

Preferably, the isolated main bearings 38, 40 are arranged at a non-drive end of the rotational element 34 of the electric motor. Additionally, material and/or geometrical characteristic of the main bearings 38, 40 may also be optimized in such a way that the capacitance and/or a breakdown voltage of the main bearings 38, 40 is increased. The isolated main bearings 38, 40 may be a hybrid bearing and/or at least one main bearing has an isolation coating and/or at least one main bearing has an isolation sleeve, and/or at least one main bearing is provided with an isolating lubricant configured to lubricate the rolling elements of the main bearing, wherein the isolating lubricant is electrically isolating. In case that the bearing assembly may include two or more main bearings 38, 40, the isolated main bearings may be of the same type, e.g., two bearings with an isolation sleeve, or of different types, e.g., a hybrid bearing and a bearing having an isolating lubricant.

Additionally, or alternatively, the main bearings 38, 40 may comprise an isolation (not shown), such as an isolating coating which is arranged around a contact surface of the inner ring and/or the outer ring of the main bearings 38, 40 to the rotor 34 or any other component to which the main bearings 38, 40 are connected. For example, the contact surface may be a bore, an end face, and/or an outer circumferential surface. Preferably, the isolation is configured as a capacitance in series such that a voltage over the rolling contacts of the rolling elements is decreased with a ratio of $C_{iso}/(C_{iso}+C_{bearing})$, wherein $C_{iso}$ is the capacitance of the isolation and $C_{bearing}$ is capacitance of the bearing.

Preferably, the isolating lubricant for the main bearings 38, 40 is a fluid, preferably a non-polar, polar base fluids or ionic fluid. For example, the isolating lubricant may be an oil or a semifluid grease composition or a grease or a water-based lubricant. Also, the isolating lubricant may include an additive that is configured to bind itself on a surface of the at least one inner raceway and/or the at least one outer raceway and/or the rolling elements of the main bearings 38, 40 and to increase a surface potential and/or a surface isolation.

In summary, a lifespan of a main bearing supporting a rotor of an electric motor can be increased by inherently increasing the main bearing capacitance and breakdown voltage, and by providing a high resistance path for the flow of currents such as common mode grounding currents and/or differential mode circulating currents while simultaneously creating a low resistance path through a sacrificial bearing for ensuring that the high frequency grounding currents are grounded. This is achieved by providing the sacrificial bearing with an electrically conductive lubricant and main bearing with an isolating lubricant.

The invention claimed is:

1. A bearing assembly for an electric motor for a vehicle, comprising:
   (i) at least one main bearing configured to support a rotational element of the electric motor, the main bearing comprising at least one inner ring providing at least one inner raceway, at least one outer ring providing at least one outer raceway, the inner and outer rings being in relative rotation, and at least one plurality of rolling elements disposed between the inner and outer rings, one of the inner and outer rings being coupled in rotation with the rotational element of the electric motor, and
   (ii) a sacrificial bearing comprising an inner ring with an inner raceway, an outer ring with an outer raceway, the inner and outer rings being in relative rotation, and a plurality of rolling elements disposed between the inner and outer rings, one of the inner and outer rings of the sacrificial bearing being coupled in rotation with the rotational element of the electric motor, the other of the inner and outer rings of the sacrificial bearing being grounded, wherein
   (iii) the sacrificial bearing is provided with a conductive lubricant configured to lubricate the rolling elements of the sacrificial bearing, wherein the conductive lubricant is electrically conductive, wherein
   (iv) the sacrificial bearing also supports the rotational elements and is allowed to be damaged due to electric current or voltage before any damage occurs in the main bearing, and wherein
   (v) the at least one main bearing is an electrically isolated bearing.

2. The bearing assembly according to claim 1, wherein the at least one main bearing which is the isolated bearing is arranged at a non-driven end of the electric motor.

3. The bearing assembly according to claim 1, wherein the at least one main bearing is a hybrid bearing and/or the at least one main bearing has an isolation coating and/or the at least one main bearing has an isolation sleeve, and/or the at least one main bearing is provided with an isolating lubricant configured to lubricate the rolling elements of the main bearing, wherein the isolating lubricant is electrically isolating.

4. The bearing assembly according to claim 1, wherein the conductive lubricant of the sacrificial bearing provides a conductivity higher than 20 μS, or an isolating lubricant of the at least one main bearing provides a conductivity of less than 1 μS.

5. The bearing assembly according to claim 1, wherein:
   (i) an isolating lubricant includes an additive that is configured to bind itself on a surface of the at least one inner raceway and/or the at least one outer raceway and/or the rolling elements of the main bearing and to increase a surface potential and/or a surface isolation; and/or
   (ii) the conductive lubricant includes an additive that is configured to bind itself on a surface of the at least one inner raceway and/or the at least one outer raceway and/or the rolling elements of the sacrificial bearing and to decrease a surface potential and/or a surface isolation.

6. The bearing assembly according to claim 1, wherein at least one surface of the at least one inner raceway and/or the at least one outer raceway of the main bearing comprises a coating such that a breakdown voltage of the surface with the coating is higher than the breakdown voltage of the surface without the coating.

7. An electric motor comprising:
   a case,
   a stator having stator windings,
   a rotor having a rotor shaft and rotor windings, and
   the bearing assembly of claim 1,
   wherein the at least one main bearing of the bearing assembly is configured to support the rotor of the electric motor, and the sacrificial bearing is configured to have at least one of the inner and outer rings fixed in rotation to the rotor.

8. The electric motor according to claim 7, wherein the at least one main bearing is designed as an isolated main bearing and is arranged at a non-driven end of the rotor of the electric motor.

9. A bearing assembly for an electric motor for a vehicle, comprising:
   (i) at least one main bearing configured to support a rotational element of the electric motor, the main bearing comprising at least one inner ring providing at least one inner raceway, at least one outer ring providing at least one outer raceway, the inner and outer rings being in relative rotation, and at least one plurality of rolling elements disposed between the inner and outer rings, one of the inner and outer rings being coupled in rotation with the rotational element of the electric motor, and (ii) a sacrificial bearing comprising an inner ring with an inner raceway, an outer ring with an outer raceway, the inner and outer rings being in relative rotation, and a plurality of rolling elements disposed between the inner and outer rings, one of the inner and outer rings of the sacrificial bearing being coupled in rotation with the rotational element of the electric motor, the other of the inner and outer rings of the sacrificial bearing being grounded, wherein iii) the sacrificial bearing is provided with a conductive lubricant configured to lubricate the rolling elements of the sacrificial bearing, wherein the conductive lubricant is electrically conductive, wherein (iv) the at least one main bearing is an electrically isolated bearing, and wherein (v) the value of the breakdown voltage of the main bearing is related to a surface roughness of a component of the main bearing, and wherein a surface roughness of a component of the main bearing is low, and/or wherein the surface roughness of a component of the sacrificial bearing is large, wherein the surface roughness of a component of the sacrificial bearing is larger than the surface roughness of a component of the main bearing.

10. A bearing assembly for an electric motor for a vehicle, comprising:

(i) at least one main bearing configured to support a rotational element of the electric motor, the main bearing comprising at least one inner ring providing at least one inner raceway, at least one outer ring providing at least one outer raceway, the inner and outer rings being in relative rotation, and at least one plurality of rolling elements disposed between the inner and outer rings, one of the inner and outer rings being coupled in rotation with the rotational element of the electric motor, and (ii) a sacrificial bearing comprising an inner ring with an inner raceway, an outer ring with an outer raceway, the inner and outer rings being in relative rotation, and a plurality of rolling elements disposed between the inner and outer rings, one of the inner and outer rings of the sacrificial bearing being coupled in rotation with the rotational element of the electric motor, the other of the inner and outer rings of the sacrificial bearing being grounded, wherein (iii) the sacrificial bearing is provided with a conductive lubricant configured to lubricate the rolling elements of the sacrificial bearing, wherein the conductive lubricant is electrically conductive, wherein (iv) the at least one main bearing is an electrically isolated bearing, and wherein (v) a breakdown voltage is related to a rolling element surface velocity, and wherein the rolling element surface velocity of the sacrificial bearing is smaller than a rolling element surface velocity of the main bearing.

* * * * *